US008565713B2

(12) United States Patent
Sennett et al.

(10) Patent No.: US 8,565,713 B2
(45) Date of Patent: Oct. 22, 2013

(54) DYNAMIC VOICE-BASED EMERGENCY NOTIFICATION

(75) Inventors: Dewayne Sennett, Redmond, WA (US); Brian Daly, Seattle, WA (US)

(73) Assignee: AT&T Mobility II LLC, Atlanta, GA (US)

(*) Notice: Subject to any disclaimer, the term of this patent is extended or adjusted under 35 U.S.C. 154(b) by 260 days.

(21) Appl. No.: 13/094,282

(22) Filed: Apr. 26, 2011

(65) Prior Publication Data
US 2012/0276864 A1 Nov. 1, 2012

(51) Int. Cl.
*H04M 11/00* (2006.01)

(52) U.S. Cl.
USPC ..................... 455/404.1; 455/404.2

(58) Field of Classification Search
USPC .......................................... 455/404.1, 404.2
See application file for complete search history.

(56) References Cited

U.S. PATENT DOCUMENTS

| | | | |
|---|---|---|---|
| 6,941,126 B1 * | 9/2005 | Jordan, Jr. ................. | 455/404.1 |
| 7,194,249 B2 * | 3/2007 | Phillips et al. ............ | 455/404.1 |
| 7,389,104 B2 * | 6/2008 | Phillips et al. ............ | 455/404.1 |
| 7,917,153 B2 * | 3/2011 | Orwant et al. ............ | 455/456.1 |
| 2006/0009234 A1 * | 1/2006 | Freer ......................... | 455/456.1 |
| 2007/0129053 A1 * | 6/2007 | Phillips et al. ............ | 455/404.1 |
| 2010/0009651 A1 * | 1/2010 | Daly et al. ................. | 455/404.1 |
| 2012/0276864 A1 * | 11/2012 | Sennett et al. ............ | 455/404.2 |
| 2012/0295570 A1 * | 11/2012 | Roin et al. ................. | 455/404.1 |

* cited by examiner

*Primary Examiner* — Charles Shedrick
(74) *Attorney, Agent, or Firm* — Woodcock Washburn LLP (57) ABSTRACT

A dynamic voice-based emergency notification system (ENS) provides wireless operators the ability to manage and deliver voice-based ENS services to subscribers within an alert area who are serviced by the wireless operator. The ENS services are provided efficiently with minimal impact to other wireless subscribers. In an example embodiment, only wireless devices, including any visitors or roamers, within the alert area receive ENS notifications.

17 Claims, 6 Drawing Sheets

DYNAMIC VOICE-BASED EMERGENCY NOTIFICATION

TECHNICAL FIELD

The technical field generally relates to public safety, and more specifically relates to providing voiced based emergency notification system (ENS) services.

BACKGROUND

The deployment of voice based emergency notification system (ENS) services, also referred to as REVERSE 911™, is expanding. The use of these systems was demonstrated during the massive California wildfires of 2007 during which voice based emergency notification systems were used to notify homeowners of the need to evacuate.

Emergency notification systems were designed and configured for a static environment in which telephones have a fixed location (e.g., landline phones) and a known number of telephones within an alert area can be calculated. However, many households are replacing fixed landline phones with mobile phones. As a result, an ENS initiator (person or entity initiating calls) may not know which mobile devices are within the specified alert area. Further, subscribers outside of an alert area inadvertently may be notified. Additionally, wireless subscribers that are roaming in an alert area may not be notified of a emergency.

SUMMARY

A dynamic voice-based emergency notification system (ENS) provides wireless operators the ability to manage and deliver voice-based ENS services to subscribers within an alert area who are serviced by the wireless operator and provide ENS services efficiently with minimal impact to other wireless subscribers. In an example embodiment, only wireless devices, including any visitors or roamers, within the alert area will receive ENS notifications. Delivery of ENS notifications controlled by a wireless network can prevent, minimize, and/or mitigate network congestion, locking of wireless 911 emergency calls, detrimental impact to first responders, detrimental impact to other subscribers on the cell sites who are outside the alert area, and voice mail system congestion.

DETAILED DESCRIPTION OF ILLUSTRATIVE EMBODIMENTS

Figure 1:
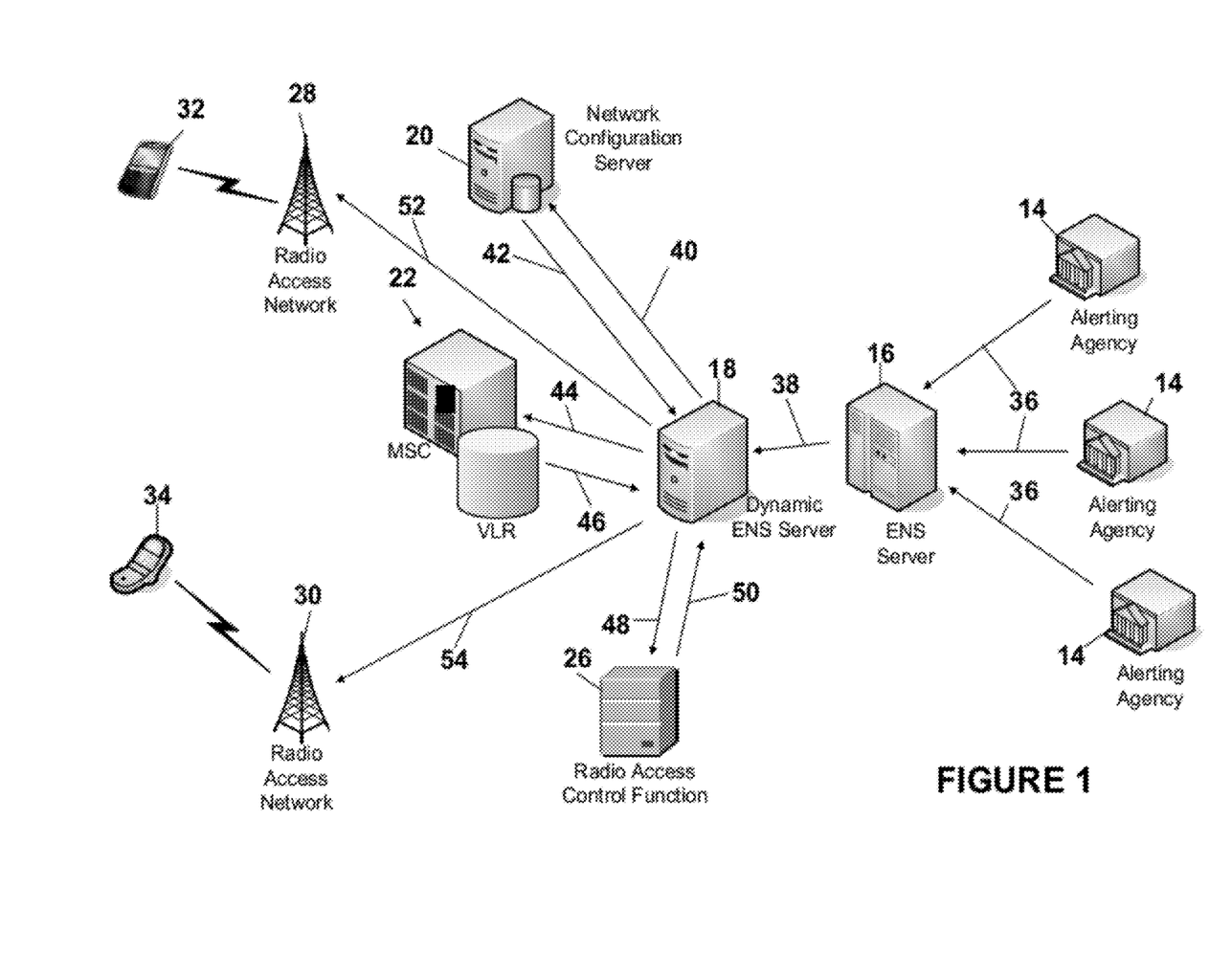
FIG. 1 illustrates an example system and process for implementing dynamic voice-based emergency notification.

FIG. 1 illustrates an example system and process for implementing dynamic voice-based emergency notification. At step 36, an alert agency 14 sends an alerting message to an emergency notification system (ENS) server 16. The alert agency can comprise any appropriate alert agency. Example alert agencies include the National Weather Service, local emergency management office, state emergency management office, President, and state Governor. The alert message can be provided to the ENS server via any appropriate means. For example, the alert message can be provide to the ENS server via a network, the Internet, a cellular network a landline network, or the like. The alert message can be provide to the ENS server via any appropriate protocol, such as, for example, the common alerting protocol (CAP). The alert message can comprise any appropriate alert message. In an example embodiment, the alert message includes a voice based ENS announcement associated with an event. For example, the voice based announcement could contain a description of an event, information associated with the event, action to take to avoid the event, action to take to escape the event, and/or contact information pertaining to the event, or the like. The voice based announcement can comprise a digital voice based announcement, an analog voice based announcement, a prerecorded message, a live message, or any appropriate combination thereof.

The event can comprise any appropriate event. For example, an event can pertain to weather conditions, disasters, AMBER (America's Missing: Broadcast Emergency Response) alerts, public announcements, or the like. The alert message also could include an indication of an alert area. The alert area comprises a location, geographic area, or the like, to be notified of the event. The alert area can include a current geographic location of an event, a predicted geographic location of an event, a trajectory of an event, or the like. For example, an alert message can be issued for a specific area affected by a natural disaster, such as a hurricane or a flood. The area covered by the alert may span a portion of one or more states, and may cover tens or even hundreds of square miles depending on the type and severity of the emergency. In an example embodiment, a voice based ENS announcement, an indication of an alert area, and an ENS message expiration date and time are provided to the ENS server 16.

At step 38, the ENS server 16 provides the ENS message, the indication of the alert area, and the ENS message expiration date and time to a dynamic ENS server 18 in a wireless communications network. At step 40, the dynamic ENS server 18 provides to a network configuration server 20, the indication of the alert area. The indication of the alert area can be in any appropriate format. For example, the indication of the alert area could indicate a state, county, city zip code, a polygon, a circle, an ellipse, GNIS (Geographic Names Information System) code, NOAA S.A.M.E. code (National Oceanographic and Atmospheric Association Specific Area Message Encoding code), FIPS code (Federal Information Processing Standards code), or the like, or any appropriate combination thereof.

The network configuration server 20, using the indication of the desired alert area and its internal configuration database, determines/identifies which cell sites are within the alert area and/or provide radio coverage to the alert area. The network configuration server 20 responds to the dynamic ENS server 18, at step 42. In an example embodiment, the response comprises identified cell sites (e.g., a list) that are within the alert area and/or provide coverage to the alert area, radio access control function entities for the listed cell sites, mobile switching centers (MSCs) and visitor location registers (VLRs) (e.g., a list) associated with the listed cell sites, and a maximum threshold for dynamic ENS messages indicating the maximum number of ENS messages that can be accommodated (concurrently provided). The maximum number of concurrent ENS messages can comprise any appropriate number of messages. In an example embodiment, to determine a maximum number of concurrent ENS messages that can be accommodated, the following factors are considered: the number of cell sites, the number and size of the communications links between the MSC and a cell site, and the size and/or capacity of the MSC. Depending upon the type of communications network involved, various entities can perform radio access control functions. For example, in a Global System for Communications (GSM) network, a base station controller (BSC) could provide radio access control functions, in a Universal Mobile Telecommunications System (UTMS) network, a Node B could provide radio access control functions, and in a Long Term Evolution (LTE) network, an eNode B could provide radio access control functions.

Upon receipt of the response provided at step 42, the dynamic ENS server 18 provides, at step 44, a request to each of the identified MSC/VLRs 22 for all subscribers (and thus subscriber communications devices) currently registered on each respective MSC and the their last known cell sites as indicated on the respective associated VLR entries. Note that FIG. 1 depicts a single MSC/VLR pair 22 for the sake of clarity, which is not to be construed as limiting the number of identified MSC/VLRs to one. Rather, any number of MSC/VLRs could be identified. For each identified MSC/VLR, the dynamic ENS server 18 requests, at step 44, from each respective MSC/VLR 22, a list of all subscribers currently registered on the respective MSC and their last known cell site as per the associated VLR entries. The MSC/VLR 22 provides a response to this request at step 46.

Upon receipt of the response provided at step 46, the dynamic ENS server 18, compares the list of subscribers and their last known cell sites as identified by the MSC/VLR with the list of cell sites identified to be in and/or provide coverage to the alert area (received via step 42 from the network configuration server 20). The dynamic ENS server subsequently generates list of targeted subscribers, and thus targeted subscriber communication devices (e.g., cell phones) where the last known cell site matches a cell site for the alert area.

At step 48, the dynamic ENS server 18 provides a request to each identified radio access control function entity (as received via step 42 from the network configuration server 20), for current utilization statistics for the links and radio resources for the cells and sectors which are within and/or provide coverage to the indicated alert area. And, each radio access control function entity 26 provides a response thereto at step 50. Example statics include the number of available radio channels, the current link utilization between cell sites and radio access networks and MSCs, the number of users registered within a particular area, the number of active calls in progress, the average duration of calls, and current utilization of paging channels. Note that FIG. 1 depicts a single radio access control function entity 26 for the sake of clarity, which is not to be construed as limiting the number of identified radio access control function entities to one. Rather, any number of radio access control function entities could be identified.

Using the provided maximum thresholds, the dynamic ENS server 18 determines the estimated resources available for the ENS message within each MSC and within the cell sites in and/or covering the alert area. For example, a configured maximum threshold of 80% for ENS services could indicate that ENS messages cannot increase the utilization of resources beyond 80%. As another example, if the current resource utilization is 50% and the maximum threshold is 80%, the dynamic ENS server 18 could use up to 30% of the resources for ENS messages. Maximum thresholds could vary by MSC or cell site depending on the associated service area (e.g., for some the maximum could be 90% and for others the maximum may be 75%).

Using the determined estimated resources and the duration (ENS message expiration date and time) of the ENS voice message, the dynamic ENS server 18 determines/calculates the estimated number of simultaneous voice based ENS messages that can be initiated while remaining within the limits of the maximum thresholds. This calculation may be an estimate because voice communications from other sources could occur which could reduce the available resources for the ENS messages.

Using the list of targeted communications devices and the determined number of simultaneous voice ENS messages, the dynamic ENS server 18 initiates voice phone calls to the targeted communications devices to deliver the ENS voice message that was received from the ENS server 16. The provision of the ENS message to the targeted communications devices is depicted in FIG. 1 at steps 52 and 54 via radio access networks 28 and 30 to communications device 32 and 34.

In an example embodiment, the dynamic ENS server 18 repeats steps to verify that the maximum thresholds are not being exceeded. For example, the dynamic ENS server 18 can request from each identified radio access control function entity the current utilization statistics for the links and radio resources for the cells and sectors which are within and/or provide coverage to the indicated alert area. And, using the provided maximum thresholds, the dynamic ENS server 18 can again determine the estimated resources available for the ENS message within each MSC and within the cell sites in and/or covering the alert area. And, using the list of targeted communications devices and the determined number of simultaneous voice ENS messages, the dynamic ENS server 18 can again initiate voice phone calls to the targeted communications devices to deliver the ENS voice.

Successful ENS message phone calls can be maintained in a successful delivery list. Failed ENS messages can be discarded. The dynamic ENS server 18 stops sending the ENS message at the expiration time. The dynamic ENS server 18 can build a new list of candidate communications devices for receiving the ENS message as follows: The dynamic ENS server can again retrieve the list of candidate communications devices for the ENS message. The dynamic ENS server 18 can again compare the list of candidate communications devices with the aforementioned successful delivery list, and all communications devices on the successful delivery list can be removed from the list of candidate communications devices. The list of candidate communications devices can contain any communications devices which have entered the alert area. Failed ENS messages also can be included if that communications device is still within the alert area. The dynamic ENS server 18 can deliver ENS messages to the communications devices in the new list of candidate communications devices as described above. This can be repeated until the expiration time of the ENS message.

Figure 2:
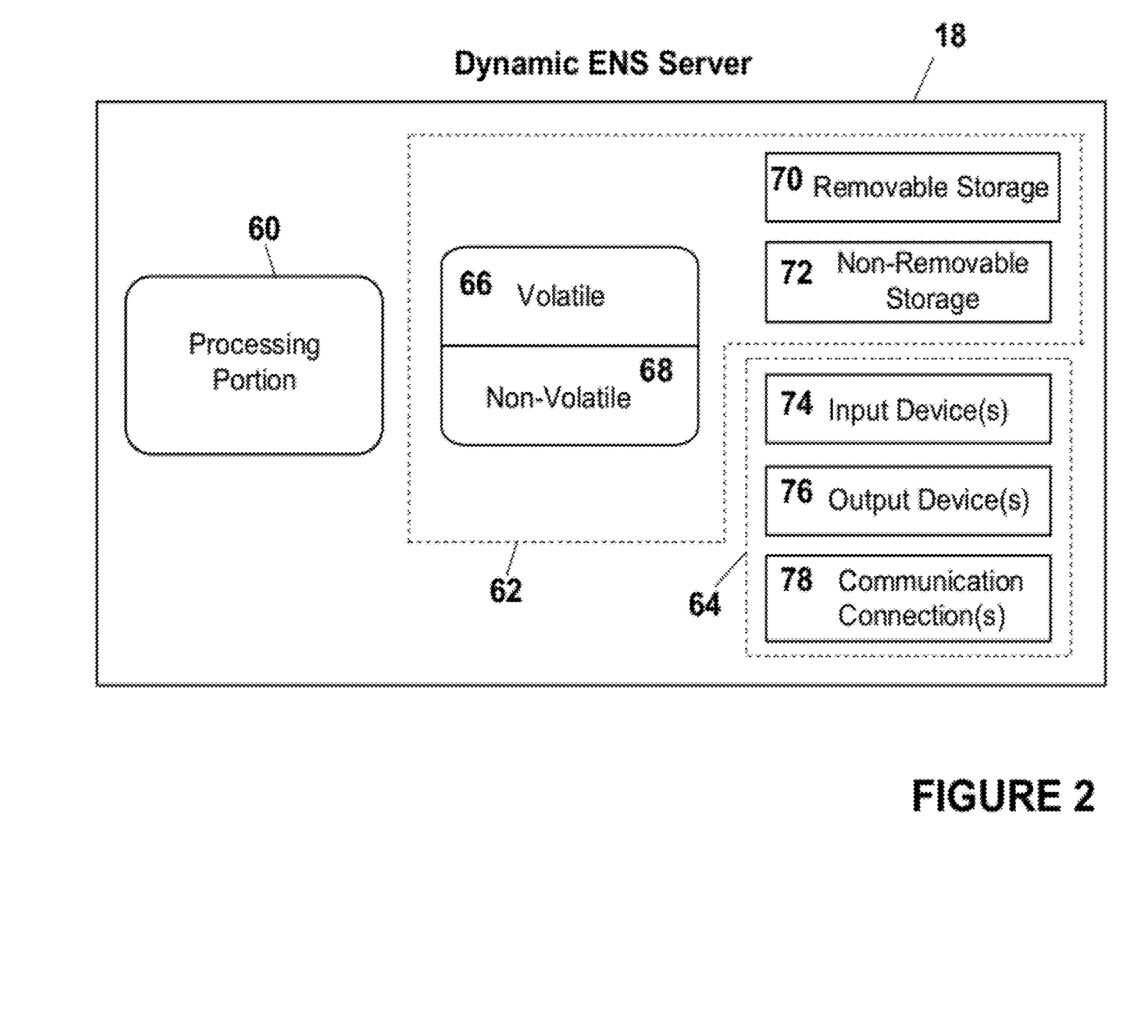
FIG. 2 is a block diagram of a dynamic ENS server.

FIG. 2 is a block diagram of a dynamic ENS server 18. In an example embodiment, the dynamic ENS server 18 comprises a network entity comprising hardware, or a combination of hardware and software. And, each portion of the dynamic ENS server 18 comprises hardware, or a combination of hardware and software. When used in conjunction with a network, the functionality needed to facilitate dynamic voice based emergency notification can reside in any one or combination of dynamic ENS server servers. The dynamic ENS server 18 depicted in FIG. 2 represents any appropriate network entity, apparatus, or combination of network entities or apparatuses, such as a processor, a server, a gateway, etc., or any combination thereof. It is emphasized that the block diagram depicted in FIG. 2 is exemplary and not intended to imply a specific implementation or configuration. Thus, the dynamic ENS server 18 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the dynamic ENS server 18 comprises a processing portion 60, a memory portion 62, and an input/output portion 64. The processing portion 60, memory portion 62, and input/output portion 64 are coupled together (coupling not shown in FIG. 2) to allow communications therebetween. The input/output portion 64 is capable of receiving and/or providing information from/to a device (e.g., communications devices 32, 34), other network entities (e.g., network configuration server 20, MSC/VLR 22, radio access control function entity 26, ENS server 16), and/or other dynamic ENS servers configured to be utilized when facilitating dynamic voice based emergency notification. For example, the input/output portion 62 is capable of, in conjunction with any other portion of the dynamic ENS server 18 as needed, providing and/or receiving information pertaining to: a query, response to a query, an alerting message, an indication of an alert area, an ENS message expiration date and time, a voice based ENS announcement, an indication of an alert area, cell sites associated with alert area, MSCs associated with a cell site, VLRs associated with an MSC/cell site, a maximum threshold for dynamic ENS messages, subscribers associated with an MSC/VLR, communications devices registered with an MSC/VLR, subscribers in an alert area, communications devices in an alert area, utilization statistics for links and radio resources for cells and sectors, or the like, or any combination thereof.

The processing portion 60 is capable of performing functions associated with the dynamic voice based emergency notification, as described herein. For example, the processing portion 60 is capable of, in conjunction with any other portion of the dynamic ENS server 18 as needed, determining and/or processing: a query, response to a query, an alerting message, an indication of an alert area, an ENS message expiration date and time, a voice based ENS announcement, an indication of an alert area, cell sites associated with alert area, MSCs associated with a cell site, VLRs associated with an MSC/cell site, a maximum threshold for dynamic ENS messages, subscribers associated with an MSC/VLR, communications devices registered with an MSC/VLR, subscribers in an alert area, communications devices in an alert area, utilization statistics for links and radio resources for cells and sectors, or the like, or any combination thereof.

The memory portion 62 can store any information utilized in conjunction with dynamic voice based emergency notification, as described herein. For example, the memory portion 62 is capable of storing information pertaining to a query, response to a query, an alerting message, an indication of an alert area, an ENS message expiration date and time, a voice based ENS announcement, an indication of an alert area, cell sites associated with alert area, MSCs associated with a cell site, VLRs associated with an MSC/cell site, a maximum threshold for dynamic ENS messages, subscribers associated with an MSC/VLR, communications devices registered with an MSC/VLR, subscribers in an alert area, communications devices in an alert area, utilization statistics for links and radio resources for cells and sectors, or the like, or a combination thereof. Depending upon the exact configuration and type of Dynamic ENS server 18, the memory portion 62 can include a computer storage medium, or media, that is volatile 66 (such as dynamic RAM), non-volatile 68 (such as ROM), or a combination thereof. The Dynamic ENS server 18 can include additional storage, in the form of computer storage media (e.g., removable storage 70 and/or non-removable storage 72) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is an article of manufacture.

The dynamic ENS server 18 also can contain communications connection(s) 78 that allow the Dynamic ENS server 18 to communicate with other devices, network entities, or the like. A communications connection(s) can comprise communication media. Communication media can be used to communicate computer readable instructions, data structures, program modules, or other data. Communication media can include an appropriate transport mechanism or information delivery media that can be used to transport a modulated data signal such as a carrier wave.

The Dynamic ENS server 18 also can include input device(s) 74 such as keyboard, mouse, pen, voice input device, touch input device, an optical input device, etc. Output device(s) 76 such as a display, speakers, printer, mechanical vibrators, etc. also can be included.

The communications device (e.g., communications device 14) and the network entity (Dynamic ENS server 18) can be part of and/or in communication with various wireless communications networks. Some of which are described below.

Figure 3:
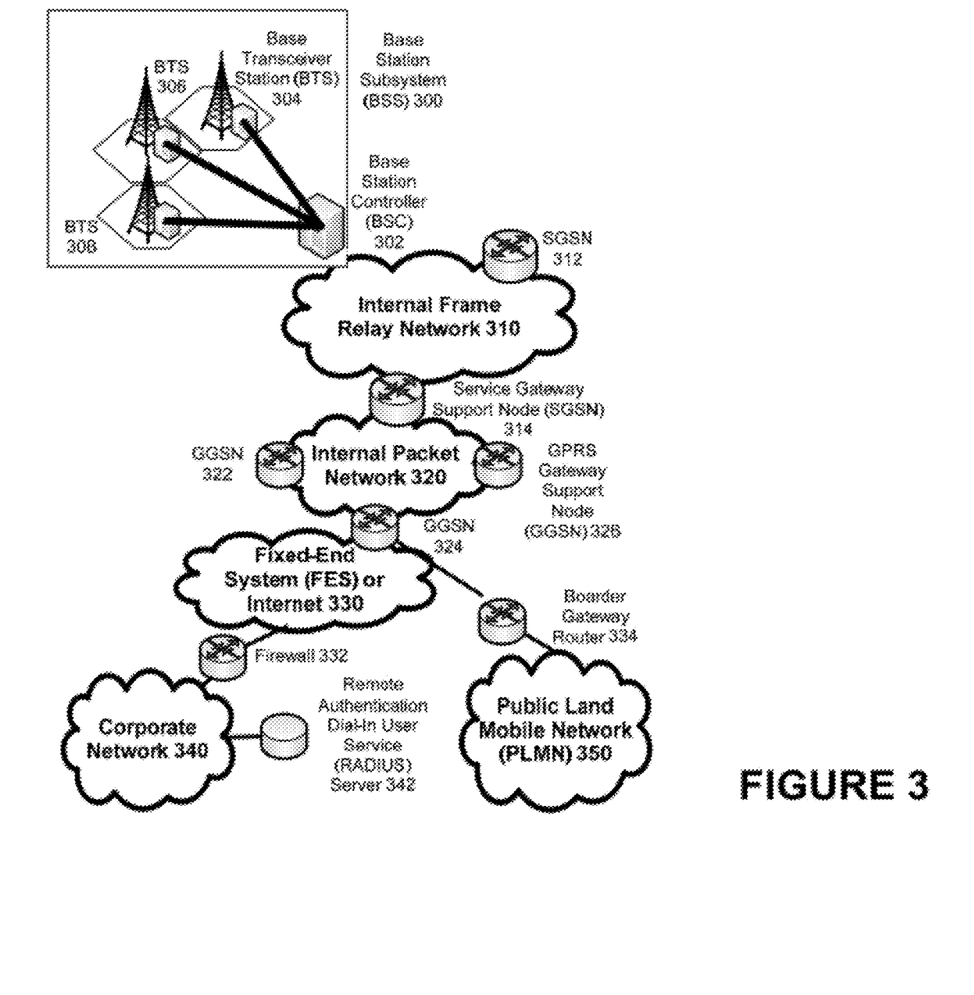
FIG. 3 depicts an overall block diagram of an exemplary packet-based mobile cellular network environment, such as a GPRS network, in which dynamic voice based emergency notification can be implemented.

FIG. 3 depicts an overall block diagram of an exemplary packet-based mobile cellular network environment, such as a GPRS network, in which dynamic voice based emergency notification can be implemented. In the exemplary packet-based mobile cellular network environment shown in FIG. 3, there are a plurality of Base Station Subsystems ("BSS") 300 (only one is shown), each of which comprises a Base Station Controller ("BSC") 302 serving a plurality of Base Transceiver Stations ("BTS") such as BTSs 304, 306, and 308. BTSs 304, 306, 308, etc. are the access points where users of packet-based mobile devices become connected to the wireless network. In exemplary fashion, the packet traffic originating from user devices is transported via an over-the-air interface to a BTS 308, and from the BTS 308 to the BSC 302. Base station subsystems, such as BSS 300, are a part of internal frame relay network 310 that can include Service GPRS Support Nodes ("SGSN") such as SGSN 312 and 314. Each SGSN is connected to an internal packet network 320 through which a SGSN 312, 314, etc. can route data packets to and from a plurality of gateway GPRS support nodes (GGSN) 322, 324, 326, etc. As illustrated, SGSN 314 and GGSNs 322, 324, and 326 are part of internal packet network 320. Gateway GPRS serving nodes 322, 324 and 326 mainly provide an interface to external Internet Protocol ("IP") networks such as Public Land Mobile Network ("PLMN") 350, corporate intranets 340, or Fixed-End System ("FES") or the public Internet 330. As illustrated, subscriber corporate network 340 may be connected to GGSN 324 via firewall 332;

and PLMN 350 is connected to GGSN 324 via boarder gateway router 334. The Remote Authentication Dial-In User Service ("RADIUS") server 342 may be used for caller authentication when a user of a mobile cellular device calls corporate network 340.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 4:
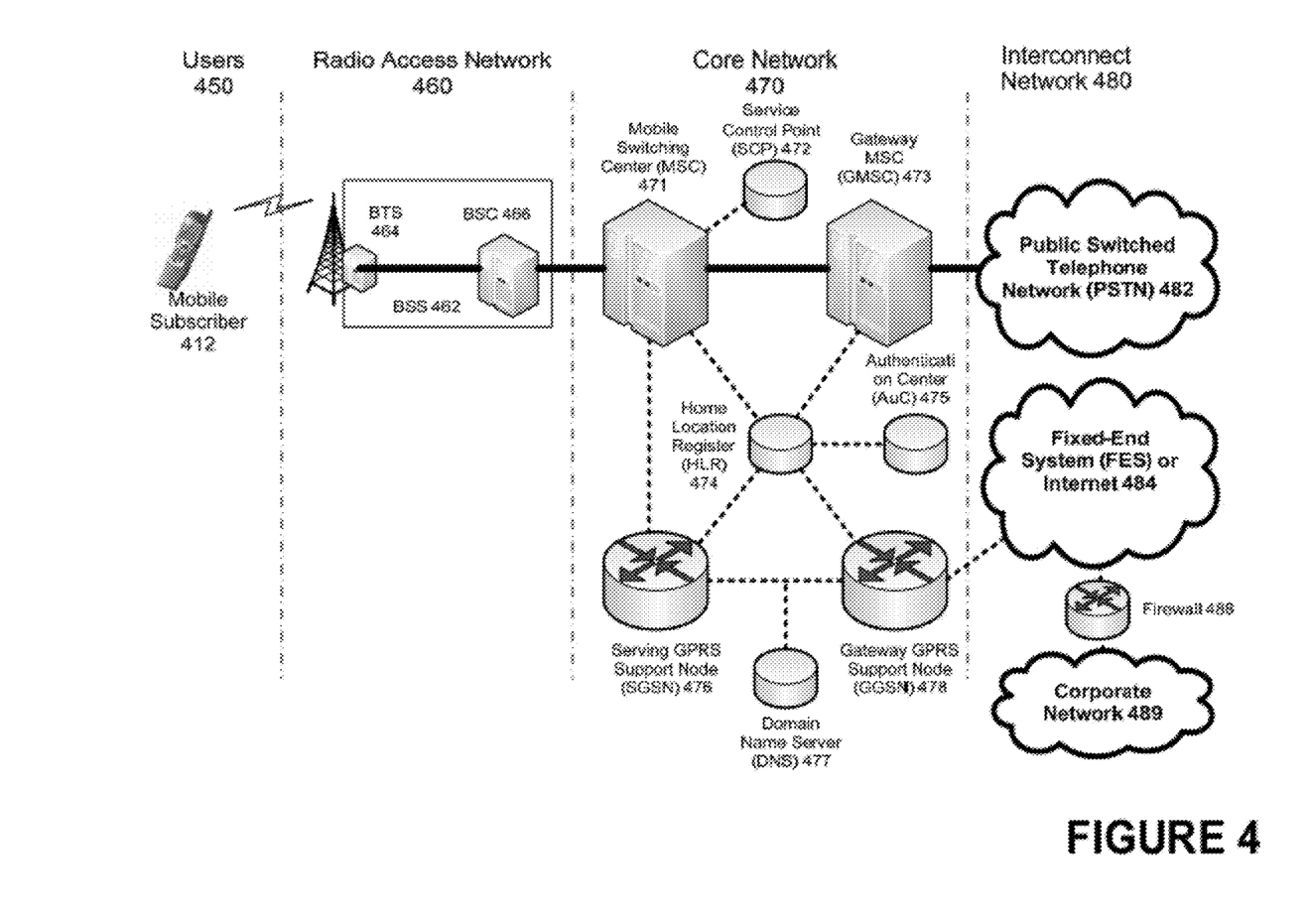
FIG. 4 illustrates an architecture of a typical GPRS network in which dynamic voice based emergency notification can be implemented.

FIG. 4 illustrates an architecture of a typical GPRS network in which dynamic voice based emergency notification can be implemented. The architecture depicted in FIG. 4 is segmented into four groups: users 450, radio access network 460, core network 470, and interconnect network 480. Users 450 comprise a plurality of end users. Note, device 412 is referred to as a mobile subscriber in the description of network shown in FIG. 4. In an example embodiment, the device depicted as mobile subscriber 412 comprises a communications device (e.g., wireless anti-theft security communications device 14). Radio access network 460 comprises a plurality of base station subsystems such as BSSs 462, which include BTSs 464 and BSCs 466. Core network 470 comprises a host of various network elements. As illustrated in FIG. 4, core network 470 may comprise Mobile Switching Center ("MSC") 471, Service Control Point ("SCP") 472, gateway MSC 473, SGSN 476, Home Location Register ("HLR") 474, Authentication Center ("AuC") 475, Domain Name Server ("DNS") 477, and GGSN 478. Interconnect network 480 also comprises a host of various networks and other network elements. As illustrated in FIG. 4, interconnect network 480 comprises Public Switched Telephone Network ("PSTN") 482, Fixed-End System ("FES") or Internet 484, firewall 488, and Corporate Network 489.

A mobile switching center can be connected to a large number of base station controllers. At MSC 471, for instance, depending on the type of traffic, the traffic may be separated in that voice may be sent to Public Switched Telephone Network ("PSTN") 482 through Gateway MSC ("GMSC") 473, and/or data may be sent to SGSN 476, which then sends the data traffic to GGSN 478 for further forwarding.

When MSC 471 receives call traffic, for example, from BSC 466, it sends a query to a database hosted by SCP 472. The SCP 472 processes the request and issues a response to MSC 471 so that it may continue call processing as appropriate.

The HLR 474 is a centralized database for users to register to the GPRS network. HLR 474 stores static information about the subscribers such as the International Mobile Subscriber Identity ("IMSI"), subscribed services, and a key for authenticating the subscriber. HLR 474 also stores dynamic subscriber information such as the current location of the mobile subscriber. Associated with HLR 474 is AuC 475. AuC 475 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 4, when mobile subscriber 412 initiates the attach process by turning on the network capabilities of the mobile device, an attach request is sent by mobile subscriber 412 to SGSN 476. The SGSN 476 queries another SGSN, to which mobile subscriber 412 was attached before, for the identity of mobile subscriber 412. Upon receiving the identity of mobile subscriber 412 from the other SGSN, SGSN 476 requests more information from mobile subscriber 412. This information is used to authenticate mobile subscriber 412 to SGSN 476 by HLR 474. Once verified, SGSN 476 sends a location update to HLR 474 indicating the change of location to a new SGSN, in this case SGSN 476. HLR 474 notifies the old SGSN, to which mobile subscriber 412 was attached before, to cancel the location process for mobile subscriber 412. HLR 474 then notifies SGSN 476 that the location update has been performed. At this time, SGSN 476 sends an Attach Accept message to mobile subscriber 412, which in turn sends an Attach Complete message to SGSN 476.

After attaching itself with the network, mobile subscriber 412 then goes through the authentication process. In the authentication process, SGSN 476 sends the authentication information to HLR 474, which sends information back to SGSN 476 based on the user profile that was part of the user's initial setup. The SGSN 476 then sends a request for authentication and ciphering to mobile subscriber 412. The mobile subscriber 412 uses an algorithm to send the user identification (ID) and password to SGSN 476. The SGSN 476 uses the same algorithm and compares the result. If a match occurs, SGSN 476 authenticates mobile subscriber 412.

Next, the mobile subscriber 412 establishes a user session with the destination network, corporate network 489, by going through a Packet Data Protocol ("PDP") activation process. Briefly, in the process, mobile subscriber 412 requests access to the Access Point Name ("APN"), for example, UPS.com, and SGSN 476 receives the activation request from mobile subscriber 412. SGSN 476 then initiates a Domain Name Service ("DNS") query to learn which GGSN node has access to the UPS.com APN. The DNS query is sent to the DNS server within the core network 470, such as DNS 477, which is provisioned to map to one or more GGSN nodes in the core network 470. Based on the APN, the mapped GGSN 478 can access the requested corporate network 489. The SGSN 476 then sends to GGSN 478 a Create Packet Data Protocol ("PDP") Context Request message that contains necessary information. The GGSN 478 sends a Create PDP Context Response message to SGSN 476, which then sends an Activate PDP Context Accept message to mobile subscriber 412.

Once activated, data packets of the call made by mobile subscriber 412 can then go through radio access network 460, core network 470, and interconnect network 480, in a particular fixed-end system or Internet 484 and firewall 488, to reach corporate network 489.

Figure 5:
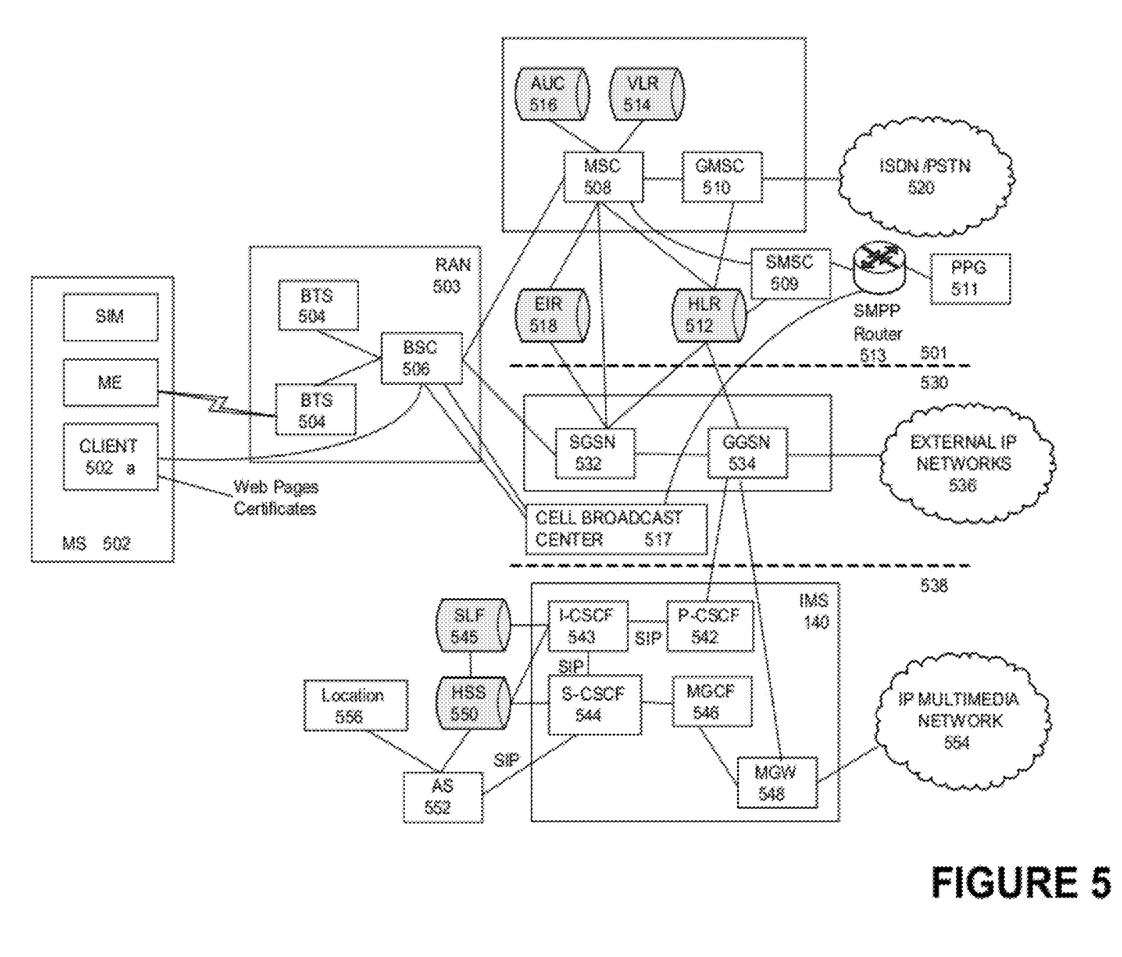
FIG. 5 illustrates an exemplary block diagram view of a GSM/GPRS/IP multimedia network architecture within which dynamic voice based emergency notification can be implemented.

FIG. 5 illustrates an exemplary block diagram view of a GSM/GPRS/IP multimedia network architecture within which dynamic voice based emergency notification can be implemented. As illustrated, the architecture of FIG. 5 includes a GSM core network 501, a GPRS network 530 and an IP multimedia network 538. The GSM core network 501 includes a Mobile Station (MS) 502, at least one Base Transceiver Station (BTS) 504 and a Base Station Controller (BSC) 506. The MS 502 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 504 is physical equipment, such as a radio tower, that enables a radio interface to communicate with the MS. Each BTS may serve more than one MS. The BSC 506 manages radio resources, including the BTS. The BSC may be connected to several BTSs. The BSC and BTS components, in combination, are generally referred to as a base station (BSS) or radio access network (RAN) 503.

The GSM core network 501 also includes a Mobile Switching Center (MSC) 508, a Gateway Mobile Switching Center (GMSC) 510, a Home Location Register (HLR) 512, Visitor Location Register (VLR) 514, an Authentication Center (AuC) 518, and an Equipment Identity Register (EIR) 516. The MSC 508 performs a switching function for the network. The MSC also performs other functions, such as registration, authentication, location updating, handovers, and call routing. The GMSC 510 provides a gateway between the GSM network and other networks, such as an Integrated Services Digital Network (ISDN) or Public Switched Telephone Networks (PSTNs) 520. Thus, the GMSC 510 provides interworking functionality with external networks.

The HLR 512 is a database that contains administrative information regarding each subscriber registered in a corresponding GSM network. The HLR 512 also contains the current location of each MS. The VLR 514 is a database that contains selected administrative information from the HLR 512. The VLR contains information necessary for call control and provision of subscribed services for each MS currently located in a geographical area controlled by the VLR. The HLR 512 and the VLR 514, together with the MSC 508, provide the call routing and roaming capabilities of GSM. The AuC 516 provides the parameters needed for authentication and encryption functions. Such parameters allow verification of a subscriber's identity. The EIR 518 stores security-sensitive information about the mobile equipment.

A Short Message Service Center (SMSC) 509 allows one-to-one Short Message Service (SMS) messages to be sent to/from the MS 502. A Push Proxy Gateway (PPG) 511 is used to "push" (i.e., send without a synchronous request) content to the MS 502. The PPG 511 acts as a proxy between wired and wireless networks to facilitate pushing of data to the MS 502. A Short Message Peer to Peer (SMPP) protocol router 513 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 502 sends a location update including its current location information to the MSC/VLR, via the BTS 504 and the BSC 506. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 530 is logically implemented on the GSM core network architecture by introducing two packet-switching network nodes, a serving GPRS support node (SGSN) 532, a cell broadcast and a Gateway GPRS support node (GGSN) 534. The SGSN 532 is at the same hierarchical level as the MSC 508 in the GSM network. The SGSN controls the connection between the GPRS network and the MS 502. The SGSN also keeps track of individual MS's locations and security functions and access controls.

A Cell Broadcast Center (CBC) 517 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 534 provides a gateway between the GPRS network and a public packet network (PDN) or other IP networks 536. That is, the GGSN provides interworking functionality with external networks, and sets up a logical link to the MS through the SGSN. When packet-switched data leaves the GPRS network, it is transferred to an external TCP-IP network 536, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 530 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 538 was introduced with 3GPP Release 5, and includes an IP multimedia subsystem (IMS) 540 to provide rich multimedia services to end users. A representative set of the network entities within the IMS 540 are a call/session control function (CSCF), a media gateway control function (MGCF) 546, a media gateway (MGW) 548, and a master subscriber database, called a home subscriber server (HSS) 550. The HSS 550 may be common to the GSM network 501, the GPRS network 530 as well as the IP multimedia network 538.

The IP multimedia system 540 is built around the call/session control function, of which there are three types: an interrogating CSCF (I-CSCF) 543, a proxy CSCF (P-CSCF) 542, and a serving CSCF (S-CSCF) 544. The P-CSCF 542 is the MS's first point of contact with the IMS 540. The P-CSCF 542 forwards session initiation protocol (SIP) messages received from the MS to an SIP server in a home network (and vice versa) of the MS. The P-CSCF 542 may also modify an outgoing request according to a set of rules defined by the network operator (for example, address analysis and potential modification).

The I-CSCF 543, forms an entrance to a home network and hides the inner topology of the home network from other networks and provides flexibility for selecting an S-CSCF. The I-CSCF 543 may contact a subscriber location function (SLF) 545 to determine which HSS 550 to use for the particular subscriber, if multiple HSS's 550 are present. The S-CSCF 544 performs the session control services for the MS 502. This includes routing originating sessions to external networks and routing terminating sessions to visited networks. The S-CSCF 544 also decides whether an application server (AS) 552 is required to receive information on an incoming SIP session request to ensure appropriate service handling. This decision is based on information received from the HSS 550 (or other sources, such as an application server 552). The AS 552 also communicates to a location server 556 (e.g., a Gateway Mobile Location Center (GMLC)) that provides a position (e.g., latitude/longitude coordinates) of the MS 502.

The HSS 550 contains a subscriber profile and keeps track of which core network node is currently handling the subscriber. It also supports subscriber authentication and authorization functions (AAA). In networks with more than one HSS 550, a subscriber location function provides information on the HSS 550 that contains the profile of a given subscriber.

The MGCF 546 provides interworking functionality between SIP session control signaling from the IMS 540 and ISUP/BICC call control signaling from the external GSTN networks (not shown). It also controls the media gateway (MGW) 548 that provides user-plane interworking functionality (e.g., converting between AMR- and PCM-coded voice). The MGW 548 also communicates with other IP multimedia networks 554.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 6:
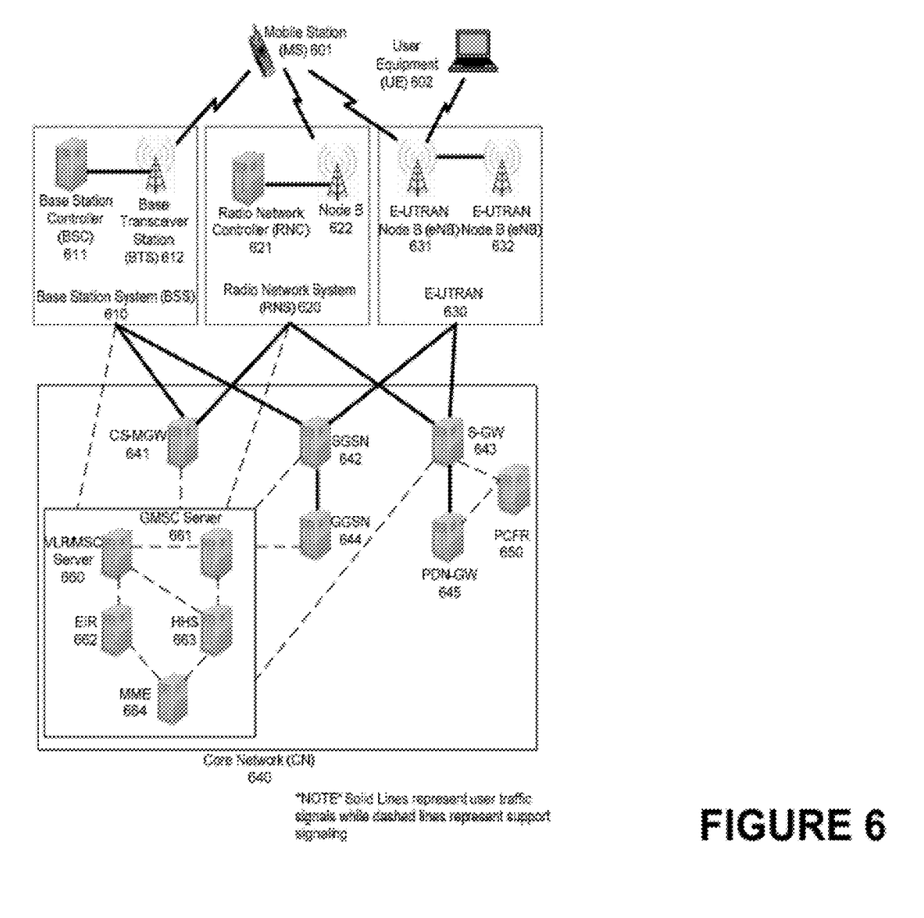
FIG. 6 illustrates a PLMN block diagram view of an exemplary architecture in which dynamic voice based emergency notification may be incorporated.

FIG. 6 illustrates a PLMN block diagram view of an exemplary architecture in which dynamic voice based emergency notification may be incorporated. Mobile Station (MS) 601 is the physical equipment used by the PLMN subscriber. In one illustrative embodiment, communications device 40 may serve as Mobile Station 601. Mobile Station 601 may be one of, but not limited to, a cellular telephone, a cellular telephone in combination with another electronic device or any other wireless mobile communication device.

Mobile Station 601 may communicate wirelessly with Base Station System (BSS) 610. BSS 610 contains a Base Station Controller (BSC) 611 and a Base Transceiver Station (BTS) 612. BSS 610 may include a single BSC 611/BTS 612 pair (Base Station) or a system of BSC/BTS pairs which are part of a larger network. BSS 610 is responsible for communicating with Mobile Station 601 and may support one or more cells. BSS 610 is responsible for handling cellular traffic and signaling between Mobile Station 601 and Core Network 640. Typically, BSS 610 performs functions that include, but are not limited to, digital conversion of speech channels, allocation of channels to mobile devices, paging, and transmission/reception of cellular signals.

Additionally, Mobile Station 601 may communicate wirelessly with Radio Network System (RNS) 620. RNS 620 contains a Radio Network Controller (RNC) 621 and one or more Node(s) B 622. RNS 620 may support one or more cells. RNS 620 may also include one or more RNC 621/Node B 622 pairs or alternatively a single RNC 621 may manage multiple Nodes B 622. RNS 620 is responsible for communicating with Mobile Station 601 in its geographically defined area. RNC 621 is responsible for controlling the Node(s) B 622 that are connected to it and is a control element in a UMTS radio access network. RNC 621 performs functions such as, but not limited to, load control, packet scheduling, handover control, security functions, as well as controlling Mobile Station 601's access to the Core Network (CN) 640.

The evolved UMTS Terrestrial Radio Access Network (E-UTRAN) 630 is a radio access network that provides wireless data communications for Mobile Station 601 and User Equipment 602. E-UTRAN 630 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 630 may include of series of logical network components such as E-UTRAN Node B (eNB) 631 and E-UTRAN Node B (eNB) 632. E-UTRAN 630 may contain one or more eNBs. User Equipment 602 may be any user device capable of connecting to E-UTRAN 630 including, but not limited to, a personal computer, laptop, mobile device, wireless router, or other device capable of wireless connectivity to E-UTRAN 630. The improved performance of the E-UTRAN 630 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 6 is the Enhanced Data rates for GSM Evolution (EDGE). EDGE is an enhancement for GPRS networks that implements an improved signal modulation scheme known as 6-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 601 may communicate with any or all of BSS 610, RNS 620, or E-UTRAN 630. In a illustrative system, each of BSS 610, RNS 620, and E-UTRAN 630 may provide Mobile Station 601 with access to Core Network 640. The Core Network 640 may include of a series of devices that route data and communications between end users. Core Network 640 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 641 is part of Core Network 640, and interacts with Visitor Location Register (VLR) and Mobile-Services Switching Center (MSC) Server 660 and Gateway MSC Server 661 in order to facilitate Core Network 640 resource control in the CS domain. Functions of CS-MGW 641 include, but are not limited to, media conversion, bearer control, payload processing and other mobile network processing such as handover or anchoring. CS-MGW 640 may receive connections to Mobile Station 601 through BSS 610, RNS 620 or both.

Serving GPRS Support Node (SGSN) 642 stores subscriber data regarding Mobile Station 601 in order to facilitate network functionality. SGSN 642 may store subscription information such as, but not limited to, the International Mobile Subscriber Identity (IMSI), temporary identities, or Packet Data Protocol (PDP) addresses. SGSN 642 may also store location information such as, but not limited to, the Gateway GPRS Support Node (GGSN) 644 address for each GGSN where an active PDP exists. GGSN 644 may implement a location register function to store subscriber data it receives from SGSN 642 such as subscription or location information.

Serving Gateway (S-GW) 643 is an interface which provides connectivity between E-UTRAN 630 and Core Network 640. Functions of S-GW 643 include, but are not limited to, packet routing, packet forwarding, transport level packet processing, event reporting to Policy and Charging Rules Function (PCRF) 650, and mobility anchoring for inter-network mobility. PCRF 650 uses information gathered from S-GW 643, as well as other sources, to make applicable policy and charging decisions related to data flows, network resources and other network administration functions. Packet Data Network Gateway (PDN-GW) 645 may provide user-to-services connectivity functionality including, but not limited to, network-wide mobility anchoring, bearer session anchoring and control, and IP address allocation for PS domain connections.

Home Subscriber Server (HSS) 663 is a database for user information, and stores subscription data regarding Mobile Station 601 or User Equipment 602 for handling calls or data sessions. Networks may contain one HSS 663 or more if additional resources are required. Exemplary data stored by HSS 663 include, but is not limited to, user identification, numbering and addressing information, security information, or location information. HSS 663 may also provide call or session establishment procedures in both the PS and CS domains.

The VLR/MSC Server 660 provides user location functionality. When Mobile Station 601 enters a new network location, it begins a registration procedure. A MSC Server for that location transfers the location information to the VLR for the area. A VLR and MSC Server may be located in the same computing environment, as is shown by VLR/MSC Server 660, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 601 registration or procedures for handover of Mobile Station 601 to a different section of the Core Network 640. GMSC Server 661 may serve as a connection to alternate GMSC Servers for other mobile stations in larger networks.

Equipment Identity Register (EIR) 662 is a logical element which may store the International Mobile Equipment Identities (IMEI) for Mobile Station 601. In a typical embodiment, user equipment may be classified as either "white listed" or "black listed" depending on its status in the network. In one embodiment, if Mobile Station 601 is stolen and put to use by an unauthorized user, it may be registered as "black listed" in EIR 662, preventing its use on the network. Mobility Management Entity (MME) 664 is a control node which may track Mobile Station 601 or User Equipment 602 if the devices are idle. Additional functionality may include the ability of MME 664 to contact an idle Mobile Station 601 or User Equipment 602 if retransmission of a previous session is required.

While example embodiments of dynamic voice based emergency notification have been described in connection with various computing devices/processors, the underlying concepts can be applied to any computing device, processor, or system capable of dynamic voice based emergency notification as described herein. The methods and apparatuses for dynamic voice based emergency notification, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for dynamic voice based emergency notification. A computer-readable storage medium, as described herein is an article of manufacture, and thus, not to be construed as a transitory signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for dynamic voice based emergency notification can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for dynamic voice based emergency notification. When implemented on a general-purpose processor, the program code combines with the processor to provide a unique apparatus that operates to invoke the functionality of dynamic voice based emergency notification.

While dynamic voice based emergency notification has been described in connection with the various embodiments of the various figures, it is to be understood that other similar embodiments can be used or modifications and additions can be made to the described embodiments for dynamic voice based emergency notification. For example, one skilled in the art will recognize that dynamic voice based emergency notification as described in the instant application may apply to any environment, whether wired or wireless, and may be applied to any number of devices connected via a communications network and interacting across the network. Therefore, dynamic voice based emergency notification should not be limited to any single embodiment, but rather should be construed in breadth and scope in accordance with the appended claims.

What is claimed:

1. A method comprising:
receiving an emergency notification message comprising a voice based message and an indication of an alert area;
receiving an indication of cell sites that provide coverage to the alert area;
receiving an indication of respective mobile switching centers associated with the cell sites that provide coverage to the alert area;
receiving an indication of communications devices registered with each respective mobile switching center;
comparing the indication of mobile switching centers associated with the cell sites that provide coverage to the alert area with the communications devices registered with each respective mobile switching center to determine communications devices within the alert area;
receiving an indication of a maximum number of voice based alert messages that can be concurrently provided; and
providing the voice based message to the communications devices within the alert area within the limits of the maximum number.

2. The method of claim 1, further comprising:
receiving an indication of utilization for cell sites and sectors providing coverage to the alert area;
receiving an indication of maximum threshold utilization for cell sites and sectors providing coverage to the alert area; and
providing the voice based message to the communications devices within the alert area within the limits of the maximum threshold utilization.

3. The method of claim 1, wherein the emergency notification message comprises an indication of an expiration date and time of the emergency notification message, the method further comprising:
repeatedly providing the voice based message to the communications devices within the alert area until the expiration date and time.

4. The method of claim 1, further comprising:
receiving an updated indication of communications devices registered with each respective mobile switching center;
comparing the updated indication of mobile switching centers associated with the cell sites that provide coverage to the alert area with the communications devices registered with each respective mobile switching center to determine updated communications devices within the alert area; and
providing the voice based message to the updated communications devices within the alert area.

5. The method of claim 1, further comprising:
generating a list of candidate communications devices to be provided the voice based message;
removing from the list, communications devices to which attempted delivery of an emergency notification message was unsuccessful;
maintaining on the list communications devices to which attempted delivery of an emergency notification message was successful; and
utilizing the list to determine which communications devices to provide the voice based message.

6. The method of claim 5, further comprising updating the list with communications devices that enter the alert area.

7. A dynamic emergency notification server comprising:
a processor; and
memory coupled to the processor, the memory comprising executable instructions that when executed by the processor cause the processor to effectuate operations comprising:
receiving an emergency notification message comprising a voice based message and an indication of an alert area;
receiving an indication of cell sites that provide coverage to the alert area;
receiving an indication of respective mobile switching centers associated with the cell sites that provide coverage to the alert area;
receiving an indication of communications devices registered with each respective mobile switching center;
comparing the indication of mobile switching centers associated with the cell sites that provide coverage to the alert area with the communications devices registered with each respective mobile switching center to determine communications devices within the alert area;
receiving an indication of a maximum number of voice based alert messages that can be concurrently provided; and
providing the voice based message to communications devices within the alert area within the limits of the maximum number.

8. The dynamic emergency notification server of claim 7, the operations further comprising:
receiving an indication of utilization for cell sites and sectors providing coverage to the alert area;
receiving an indication of maximum threshold utilization for cell sites and sectors providing coverage to the alert area; and
providing the voice based message to the communications devices within the alert area within the limits of the maximum threshold utilization.

9. The dynamic emergency notification server of claim 7, wherein the emergency notification message comprises an indication of an expiration date and time of the emergency notification message, the operations further comprising:
repeatedly providing the voice based message to the communications devices within the alert area until the expiration date and time.

10. The dynamic emergency notification server of claim 7, the operations further comprising:
receiving an updated indication of communications devices registered with each respective mobile switching center;
comparing the updated indication of mobile switching centers associated with the cell sites that provide coverage to the alert area with the communications devices registered with each respective mobile switching center to determine the updated communications devices within the alert area; and
providing the voice based message to updated communications devices within the alert area.

11. The dynamic emergency notification server of claim 7, the operations further comprising:

generating a list of candidate communications devices to be provided the voice based message;
removing from the list, communications devices to which attempted delivery of an emergency notification message was unsuccessful;
maintaining on the list communications devices to which attempted delivery of an emergency notification message was successful; and
utilizing the list to determine which communications devices to provide the voice based message.

12. The dynamic emergency notification server of claim 11, the operations further comprising:
updating the list with communications devices that enter the alert area.

13. A computer-readable storage medium comprising instructions that, when executed by a processor, cause the processor to effectuate operations comprising:
receiving an emergency notification message comprising a voice based message and an indication of an alert area;
receiving an indication of cell sites that provide coverage to the alert area;
receiving an indication of respective mobile switching centers associated with the cell sites that provide coverage to the alert area;
receiving an indication of communications devices registered with each respective mobile switching center;
comparing the indication of mobile switching centers associated with the cell sites that provide coverage to the alert area with the communications devices registered with each respective mobile switching center to determine communications devices within the alert area;
receiving an indication of a maximum number of voice based alert messages that can be concurrently provided; and
providing the voice based message to the communications devices within the alert area within the limits of the maximum number.

14. The computer-readable storage medium of claim 13, the operations further comprising:
receiving an indication of utilization for cell sites and sectors providing coverage to the alert area;
receiving an indication of maximum threshold utilization for cell sites and sectors providing coverage to the alert area; and
providing the voice based message to the communications devices within the alert area within the limits of the maximum threshold utilization.

15. The computer-readable storage medium of claim 13, wherein the emergency notification message comprises an indication of an expiration date and time of the emergency notification message, the operations further comprising:
repeatedly providing the voice based message to the communications devices within the alert area until the expiration date and time.

16. The computer-readable storage medium of claim 13, the operations further comprising:
receiving an updated indication of communications devices registered with each respective mobile switching center;
comparing the updated indication of mobile switching centers associated with the cell sites that provide coverage to the alert area with the communications devices registered with each respective mobile switching center to determine updated communications devices within the alert area; and
providing the voice based message to the updated communications devices within the alert area.

17. The computer-readable storage medium of claim 13, the operations further comprising:
generating a list of candidate communications devices to be provided the voice based message;
removing from the list, communications devices to which attempted delivery of an emergency notification message was unsuccessful;
maintaining on the list communications devices to which attempted delivery of an emergency notification message was successful;
utilizing the list to determine which communications devices to provide the voice based message; and
updating the list with communications devices that enter the alert area.

* * * * *